(12) United States Patent
Lenz et al.

(10) Patent No.: US 12,000,471 B2
(45) Date of Patent: Jun. 4, 2024

(54) SPUR GEAR

(71) Applicant: Volkswagen Aktiengesellschaft, Wolfsburg (DE)

(72) Inventors: Andreas Lenz, Wolfhagen (DE); Christian Deubner, Kaufungen (DE); Oliver Mosaner, Kassel (DE); Sebastian Wolf, Kassel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 60 days.

(21) Appl. No.: 17/775,367

(22) PCT Filed: Nov. 3, 2020

(86) PCT No.: PCT/EP2020/080833
§ 371 (c)(1),
(2) Date: May 9, 2022

(87) PCT Pub. No.: WO2021/089555
PCT Pub. Date: May 14, 2021

(65) Prior Publication Data
US 2022/0390001 A1 Dec. 8, 2022

(30) Foreign Application Priority Data
Nov. 8, 2019 (DE) .......................... 10 2019 130 185

(51) Int. Cl.
*F16H 55/17* (2006.01)
(52) U.S. Cl.
CPC ................... *F16H 55/17* (2013.01)

(58) Field of Classification Search
CPC .......... F16H 55/17; F16H 55/22; F16H 55/12; F16H 55/10; F16H 2055/185; F16H 2055/065; F16H 57/0025; F16H 55/08
See application file for complete search history.

(56) References Cited

U.S. PATENT DOCUMENTS

| | | | |
|---|---|---|---|
| 3,371,549 A * | 3/1968 | Schrempp | F16H 55/14 74/411 |
| 6,684,729 B2 | 2/2004 | Bauseler | |
| 8,141,450 B2 | 3/2012 | Haussecker et al. | |
| 2018/0180155 A1* | 6/2018 | Wehrle | B29D 15/00 |

(Continued)

FOREIGN PATENT DOCUMENTS

| | | |
|---|---|---|
| DE | 149624 A | 3/1904 |
| DE | 470406 A | 1/1929 |
| DE | 19718213 A1 | 11/1998 |

(Continued)

*Primary Examiner* — Zakaria Elahmadi
(74) *Attorney, Agent, or Firm* — Laurence A. Greenberg; Werner H. Stemer; Ralph E. Locher

(57) ABSTRACT

A spur gear includes a radially outer, spur-cut gear rim, a radially inner hub, and a rotationally symmetrical radial connecting structure which integrally connects the gear rim to the hub. The radial connecting structure has mutually spaced struts, which extend between the hub and the gear rim, and axial perforations or holes, which are situated between the struts. The radial connecting structure has a disk-shaped base body, through which the axial holes pass and which has an axial front side and an axial rear side, with the struts being situated on the front side.

9 Claims, 3 Drawing Sheets

(56) References Cited

U.S. PATENT DOCUMENTS

2021/0062906 A1* 3/2021 Mauerlechner ......... F16H 55/14

FOREIGN PATENT DOCUMENTS

| DE | 10041696 C1 | 12/2001 | | |
|---|---|---|---|---|
| DE | 102006012861 A1 | 9/2007 | | |
| DE | 202007017040 U1 | 3/2008 | | |
| DE | 102009012812 A1 | 10/2009 | | |
| DE | 102014220471 A1 * | 4/2016 | ............ | F16H 55/06 |
| DE | 102014220471 A1 | 4/2016 | | |
| DE | 102016205106 A1 | 10/2017 | | |
| DE | 102017201383 A1 | 8/2018 | | |
| WO | WO-2017054931 A1 * | 4/2017 | ............ | F16H 55/12 |
| WO | WO-2017066946 A1 * | 4/2017 | ............ | F16D 1/101 |

* cited by examiner

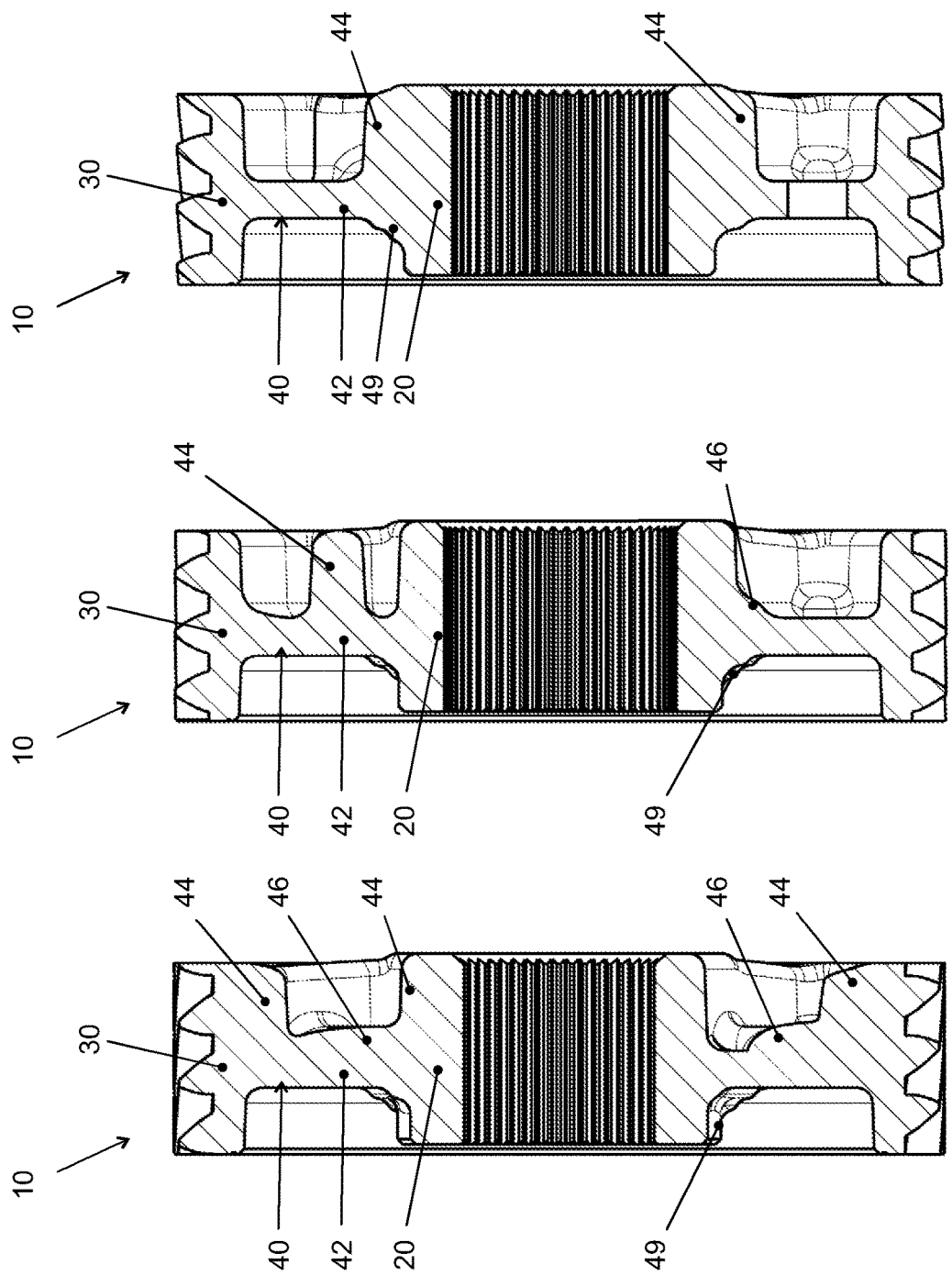

SPUR GEAR

FIELD AND BACKGROUND OF THE INVENTION

The invention relates to a spur gear, comprising:
a rotationally symmetrical spur-cut gear rim arranged radially on the outside,
a hub arranged radially on the inside, and
a rotationally symmetrical radial connecting structure which connects the gear rim to the hub, preferably integrally,
wherein the radial connecting structure has struts which are spaced apart from one another and extend between the hub and the gear rim, and axial perforations arranged between the struts.

DESCRIPTION OF THE RELATED ART

Such a spur gear is known from DE 100 41 696 C1. Spur gears, in particular those which are used in gearboxes of motor vehicle drive units, are subjected to considerable mechanical stresses. Their stability and in particular their fatigue strength are therefore essential quality criteria. On the other hand, it is a general structural aim to reduce the moving and the heavy masses involved in automotive engineering as much as possible. This results in conflicting aims, in particular in the case of gear wheels.

The abovementioned category-defining document discloses a stable spur gear in which a considerable saving in material has been made without any significant loss of stability by virtue of a particular design of the radial connecting structure between the outer gear rim and the inner hub. The radial connecting structure disclosed therein consists of two sets of strip-shaped radial struts which are integrally formed, in two planes axially offset relative to each other, on the one hand on the hub, and on the other hand on the gear rim, and are here angularly offset relative to each other circumferentially by a half-cycle. Such a gear wheel can be forged from steel.

A similarly formed gear wheel but made from thermoplastic material is known from U.S. Pat. No. 3,371,549. The starting points of all the struts here lie in the same radial plane both at the hub and at the gear rim, i.e. they are not axially offset relative to one another. However, the struts are designed so that they are curved in the axial direction, wherein in each case two struts adjacent to each other circumferentially are bent in the axially opposite direction.

DE 10 2017 201 383 A1 discloses a radial connecting structure of a spur gear which is injection-molded from a polymer material, which radial connecting structure consists of a disk-shaped base body with arabesque-like webs attached thereto on both sides. In the case of plastic spur gears, modern injection-molding technology allows almost any shapes, optimized with regard to stiffness and the saving of material, to be created, wherein, however, the overall strength of such gear wheels is highly limited by the material. In particular, plastic gear wheels are in principle not suited to use in motor vehicle drive units where they are subjected to high mechanical stresses.

Manufacturing from metal materials, in particular steel, is imperative here, wherein in particular production using forming processes, specifically forging, has proven to be particularly advantageous with regard to manufacturing speed and cost.

SUMMARY OF THE INVENTION

The object of the present invention is to further optimize a generic spur gear with regard to the conflicting aims of stability, on the one hand, and saving material, on the other hand, wherein in particular it is intended that manufacture from metal materials, in particular from steel, is possible, preferably using forming processes, in particular forging.

DESCRIPTION OF THE INVENTION

This object is achieved in conjunction with the features of the pre-characterizing clause of claim 1 in that the radial connecting structure has a disk-shaped base body, pierced by the axial perforations, with an axial front side and an axial rear side, on the front side of which the struts are arranged.

Preferred embodiments of the invention are the subject of the dependent patent claims.

The invention is based on the concept of combining a disk wheel and a spoke wheel, wherein the disk and spoke components are integrally formed on each other asymmetrically. The rear side of the spur gear according to the invention acts essentially in the manner of a disk wheel perforated by relatively small axial perforations. In contrast, its front side acts essentially in the manner of a spoke wheel with gaps between the spokes which are closed (apart from the axial perforations). In other words, the disk-shaped base body is strengthened with said struts, acting as spokes, on only one side, namely on its axial front side. The invention therefore departs from the concept of axial symmetry which is common throughout gear wheel technology.

The disk-shaped base body offers a certain fundamental stability in particular with regard to axial forces. However, for the purpose of saving material, it is here designed to be thin such that it would not be able to independently absorb the high tensile and shear forces which occur during operation without being damaged. The struts, which can however have a filigree configuration such that they would not be capable independently, i.e. without the disk-shaped base body, of absorbing axial forces without being damaged, are used for this purpose. The axial symmetry chosen according to the invention has proved not to be harmful with regard to the stability of the resulting spur gear; with regard to manufacturing using metal forming processes, in particular forging, it has, however, proved to be extremely advantageous to generate the complex shape that results from the struts on just one side and to keep the rear side of the base body with a simple shape and in particular with no such struts.

The struts expediently comprise a set of struts of a first type and a set of struts of a second type, wherein the struts of the first type have a profile which is higher than it is wide and the struts of the second type have a profile which is wider than it is high. In this way, the different types of struts are optimized to absorb different types of applied forces, which can result in a "distribution of responsibilities" between the struts, each individual one of which therefore can have a filigree configuration.

In a development of this concept of "distribution of responsibilities", it is provided that the struts are tilted about the axial direction so that they extend in a straight line and relative to the radial line intersecting their respective starting point, wherein the struts of the first type are tilted in the opposite direction to the struts of the second type. Such a configuration is suited in particular for spur gears which rotate during operation with a preferred primary direction of revolution, i.e. not equally in different directions. The struts of the first type, designed to be narrow and high, which are here preferably tilted at their hub starting point in the opposite direction to the intended direction of rotation, here serve primarily to absorb tensile forces. The struts of the second type, designed to be flat and wide, which are preferably tilted at their hub starting point in the direction of the intended direction of rotation, serve in particular to absorb shear forces.

The struts of the first type are particularly preferably here tilted by a larger angular amount than the struts of the second type. This is a result of the inventor's insight regarding the force flow of the different types of flow which are to be supported.

As explained, the present invention, in particular in its developments described, follows the concept of distributing different responsibilities to different structural elements of the radial connecting structure. In order to fulfill this concept in as pure a form as possible, it is preferably provided that the individual struts do not cross over one another. Instead, a preferred development of the invention provides that the struts of each pair of two adjacent struts of different types contact each other either at their radially outer starting points on the gear rim or their radially inner starting points on the hub. Contact between adjacent struts in the region of their extent between their respective two starting points is expressly not provided in this embodiment. Needless to say, it is clear to a person skilled in the art here that the term starting "point" is of course to be understood as an extended region which results from the finite width of the individual structural elements and is not punctiform in the mathematical sense.

The rear side of the base body is, as explained at the beginning, essentially flat, i.e. is configured in particular with no struts projecting from the plane of the disk. However, a preferred embodiment of the invention provides that a reinforcing body, which merges radially inward into the hub and is extended radially outward in a star shape, is arranged on the rear side of the base body. The star tips of the reinforcing body here never extend as far as the gear rim, which would make them struts in the sense of the description here. On the contrary, it is preferably provided that the axial perforations are arranged in a radial extension of the star tips of the reinforcing body. The axial perforations mark positions in the radial connecting structure past which the forces which occur during operation are conducted (namely via the struts). A maximum saving in material, i.e. a cut-out, can consequently be provided at these positions.

The form of the axial perforations can be configured differently. In a first embodiment, they are circular. This form is particularly advantageous with regard to production. In particular, such circular perforations can be drilled subsequently.

However, it is more favorable with regard to optimizing stability if the axial perforations are designed in the form of rounded, preferably isosceles, triangles which are flat (angle at vertex >90°) and have a vertex that faces radially inward. Although axial perforations of this type have to be introduced as part of a complex forming process, they do allow more complete removal of material at the locations which are unstressed during operation and therefore result in an improved weight saving with no loss of stability.

It has been shown that the axial position of a radial connecting structure configured according to the invention is largely irrelevant for the functional properties of the resulting spur gear. The base body can therefore, as preferably provided, be arranged axially off-center. This can be favorable in particular in construction situations where structural space is a challenge. This asymmetry namely enables a free space arranged on one side of the radial connecting structure to be created between the hub and the gear rim, in which other gearbox components can engage.

Other details and advantages of the invention will become apparent from the following specific description and the drawings.

BRIEF DESCRIPTION OF THE FIGURES

FIG. 5 shows a view in section along the line of section V-V in FIG. 3, FIG. 6 shows a view in section along the line of section VI-VI in FIG. 3, and FIG. 7 shows a view in section along the line of section VII-VII in FIG. 3.

DETAILED DESCRIPTION OF THE INVENTION

Figure 1:
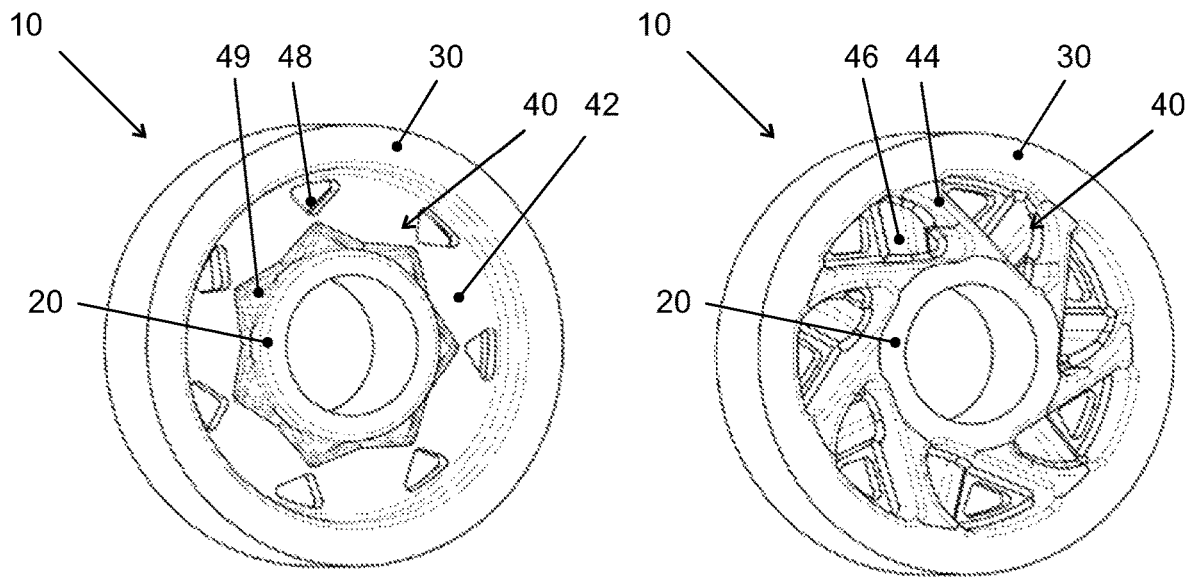
FIG. 1 shows two simplified views of a first embodiment of a spur gear according to the invention.

The same reference numerals in the drawings designate the same or similar elements.

FIG. 1 shows in a simplified view the front side (on the right in FIG. 1) and the rear side (on the left in FIG. 1) of a first embodiment of a spur gear 10 according to the invention. The spur gear 10 comprises a hub 20 radially on the inside and a gear rim 30 radially on the outside, the spur-cut teeth of which have not, however, been illustrated in FIG. 1. A radial connecting structure 40, the specific construction of which is within the focus of the present invention, extends between the hub 20 and the gear rim 30.

The radial connecting structure 40 comprises a disk-shaped base body 42 which can be clearly seen in particular in the rear view of the spur gear 10 (on the left in FIG. 1). Struts of the first type 44 and struts of the second type 46 rise from the disk-shaped base body 42 on the front side, illustrated on the right in FIG. 1, of the radial connecting structure. The struts of the first type 44 are designed so that they are narrow and high, i.e. in particular that they are higher than they are wide. The struts of the first type 46 are designed so that they are flat and wide, i.e. in particular that they are wider than they are high. The struts 44, 46 extend essentially in a straight line but do not run radially. Instead, they are tilted relative to the radial line intersecting them in each case at their starting point (on the hub 20 or on the gear rim 30). The struts of the first type 44, on the one hand, and the struts of the second type 46, on the other hand, are here tilted in opposite directions. In the embodiment illustrated, the struts of the first type 44 are tilted to the left at their starting point with respect to the hub 20, relative to the radial line there. The struts of the second type 46 are tilted to the right at their starting point on the hub 20, relative to the radial line there. The angle by which the struts of the first type 44 are tilted is here greater than the angle by which the struts of the second type 46 are tilted.

In the embodiment shown, the struts 44, 46 are arranged such that they do not cross over one another. Specifically, the struts of the second type 46 extend from the hub starting point of a strut of the first type 44 as far as the gear rim starting point of the adjacent strut of the first type 44. The same applies for struts of the first type. Each strut of the first type 44 extends from the hub starting point of a strut of the second type 46 as far as the gear rim starting point of the adjacent strut of the second type 46.

Those regions of the base body 40 which are not strengthened by struts 44, 46 are configured as axial perforations. In the embodiment in FIG. 1, the axial perforations 48 have the form of rounded, flat, isosceles triangles with a radially inwardly facing vertex.

On the rear side of the base body 42, the radial region adjoining the hub 20 of the latter is strengthened with a star-shaped reinforcing body 49. The latter rises from the surface of the disk and merges into the hub 20. Its star tips each lie on the same radial line as the center of an axial perforation 48.

Figure 2:
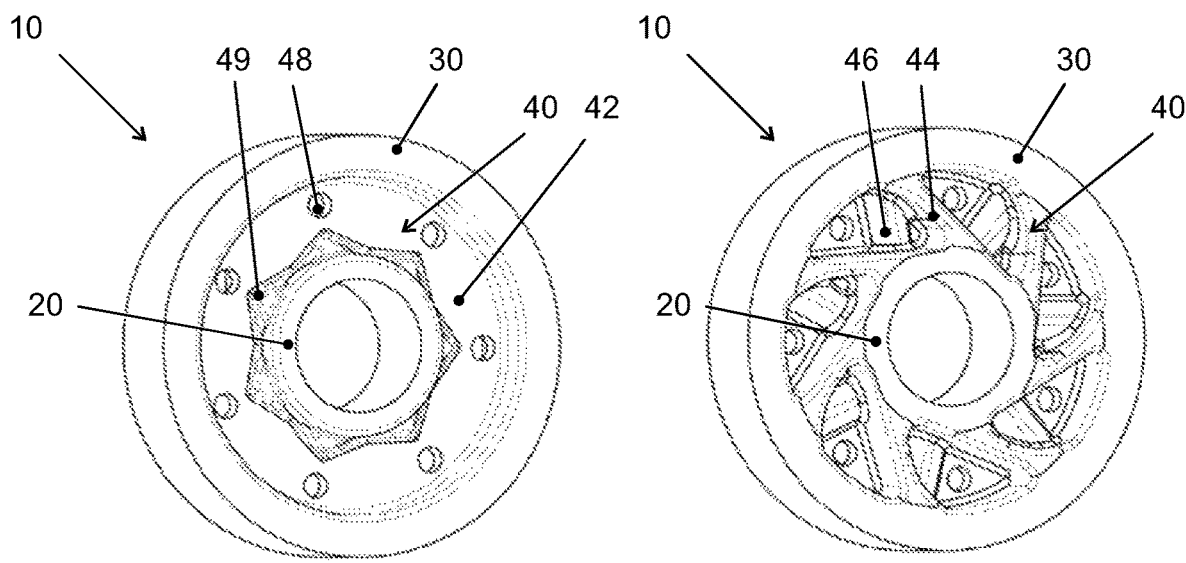
FIG. 2 shows two simplified views of a second embodiment of a spur gear according to the invention.

FIG. 2 shows an alternative embodiment of a spur gear 10 according to the invention which differs from the embodiment in FIG. 1 only in the form of the axial perforations 48 which are here designed with a circular form.

Figure 4:
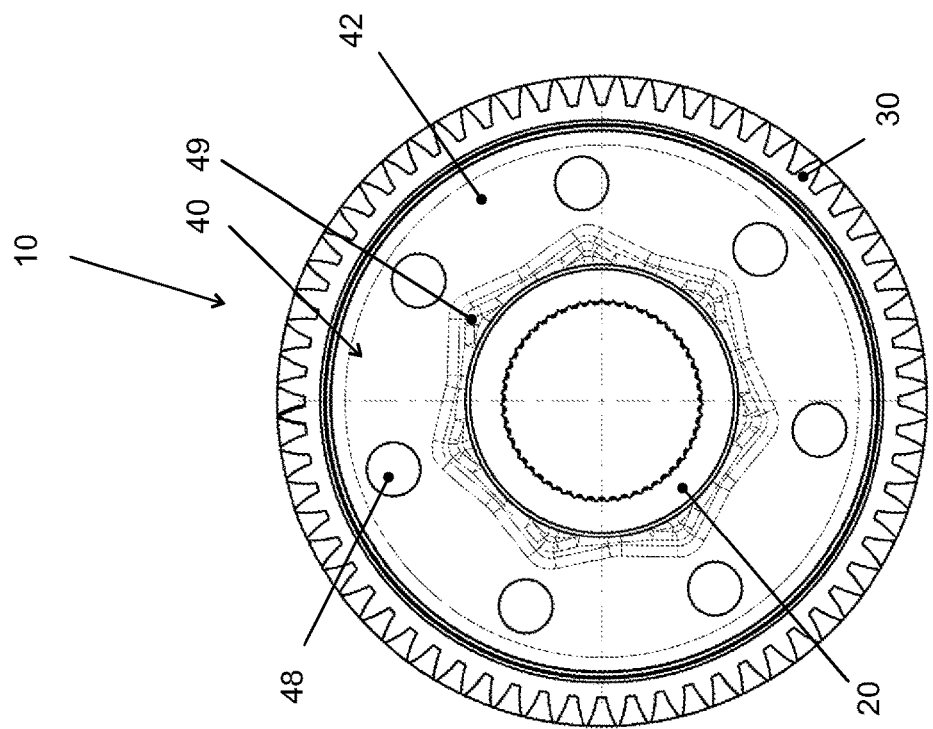
FIG. 4 shows a plan view of the rear side of the spur gear from FIG. 2.
Figure 3:
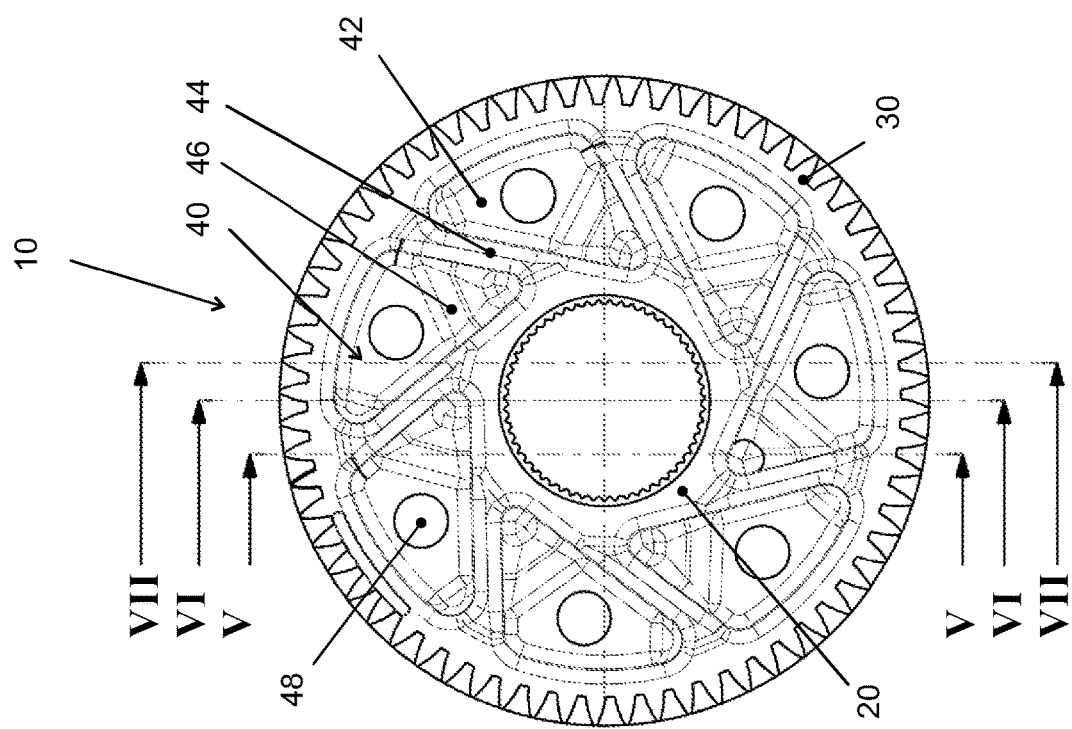
FIG. 3 shows a plan view of the front side of a spur gear according to FIG. 2.

FIG. 3 shows a detailed plan view of the front side of the spur gear 10 from FIG. 2. In the view in FIG. 3, the teeth of the gear rim 30 can also be clearly seen. The hub 20 is provided with splines on its inner circumference. FIG. 4 shows the rear side of the same spur gear 10.

FIGS. 5 to 7 show cross-sections through the spur gear 10 in FIGS. 3 and 4 along the lines of section V-V, VI-VI, and VII-VII in FIG. 3. By studying FIGS. 3 to 7 collectively, a person skilled in the art should obtain a vivid picture of the design according to the invention of the radial connecting structure 40.

In addition, the views in section in FIGS. 5 to 7 show the preferred embodiment of the invention, according to which the base body 42 is not arranged axially centrally and instead is offset (to the left in the drawings). An offset in the opposite direction and bigger or smaller offsets would also be conceivable.

The embodiments discussed in the specific description and shown in the drawings of course only represent illustrative exemplary embodiments of the present invention. A broad spectrum of possible variants are available to a person skilled in the art in the light of the disclosure in this document. In particular, the form according to the invention is suited for production of the spur gear according to the invention from a metal material, in particular steel, wherein production can take place by means of forming processes, in particular forging, in a manner which is also preferably provided for creating spur gears for use in drive units of motor vehicles, in particular in gearboxes.

LIST OF REFERENCE NUMERALS 10 spur gear
20 hub
30 gear rim
40 radial connecting structure
42 base body
44 strut of the first type
46 strut of the second type
48 axial perforation
49 reinforcing body

The invention claimed is:

1. A spur gear, comprising:
a radially-outwardly-disposed spur-cut gear rim;
a radially-inwardly-disposed hub; and
a rotationally symmetrical radial connecting structure connecting said gear rim to said hub;
all of said gear rim, said hub, and said radial connecting structure being integrally formed as one single piece;
said radial connecting structure having mutually spaced-apart struts extending between said hub and said gear rim and forming axial perforations between said struts;
said struts including a set of struts of a first type and a set of struts of a second type,
said set of struts of said first type and said set of struts of said second type each having a profile with a width and a height;
said height of said profile of said set of struts of said first type being greater than said width of said profile of said set of struts of said first type;
said width of said profile of said set of struts of said second type being greater than said height of said profile of said set of struts of said second type; and
said radial connecting structure having a disk-shaped base body penetrated by said axial perforations, said base body having an axial front side and an axial rear side, and said struts being disposed only on said front side of said base body.

2. The spur gear according to claim 1, wherein:
each of said struts has a starting point and extends in a straight line from said starting point;
each of said struts is tilted about an axial direction and relative to a radial line intersecting said starting point; and
said struts of said first type are tilted in a direction opposite to said struts of said second type.

3. The spur gear according to claim 2, wherein said struts of said first type are tilted by a larger angular amount than said struts of said second type.

4. The spur gear according to claim 2, wherein:
said starting points of said struts include radially outer starting points on said gear rim and radially inner starting points on said hub; and
said struts include pairs of two adjacent struts of different types contacting each other either at said radially outer starting points or at said radially inner starting points.

5. The spur gear according to claim 1, which further comprises a reinforcing body disposed on said rear side of said base body, said reinforcing body merging radially inward into said hub and being stretched radially outward in a star shape.

6. The spur gear according to claim 5, wherein said star-shaped reinforcing body has star tips, and said axial perforations are disposed in extension of or alignment with said star tips.

7. The spur gear according to claim 1, wherein said axial perforations have a circular shape.

8. The spur gear according to claim 1, wherein said axial perforations have a rounded, isosceles, flat triangular shape with a radially inwardly facing vertex.

9. The spur gear according to claim 1, wherein said base body is disposed axially off-center.

* * * * *